United States Patent
Slusarczyk et al.

(10) Patent No.: US 9,873,301 B2
(45) Date of Patent: Jan. 23, 2018

(54) HYDRAULIC SUSPENSION DAMPER

(71) Applicant: BeijingWest Industries Co., Ltd., Beijing (CN)

(72) Inventors: Pawel Slusarczyk, Cracow (PL); Janusz Goldasz, Cracow (PL)

(73) Assignee: BEIJINGWEST INDUSTRIES CO., LTD, Beijing (CN)

( * ) Notice: Subject to any disclaimer, the term of this patent is extended or adjusted under 35 U.S.C. 154(b) by 0 days.

(21) Appl. No.: 14/908,665

(22) PCT Filed: Jul. 31, 2013

(86) PCT No.: PCT/CN2013/080518
§ 371 (c)(1),
(2) Date: Jan. 29, 2016

(87) PCT Pub. No.: WO2015/013917
PCT Pub. Date: Feb. 5, 2015

(65) Prior Publication Data
US 2016/0167474 A1    Jun. 16, 2016

(51) Int. Cl.
*F16F 9/34* (2006.01)
*B60G 13/08* (2006.01)
*F16F 9/06* (2006.01)

(52) U.S. Cl.
CPC ............. *B60G 13/08* (2013.01); *F16F 9/061* (2013.01); *F16F 9/064* (2013.01);
(Continued)

(58) Field of Classification Search
CPC .................................................... B60G 15/12
(Continued)

(56) References Cited

U.S. PATENT DOCUMENTS 3,105,574 A    10/1963   Hoffmann et al.
3,469,661 A     9/1969   Hoffmann et al.
(Continued)

FOREIGN PATENT DOCUMENTS

CN    201377535 Y    1/2010
CN    201535338 U    7/2010
(Continued)

OTHER PUBLICATIONS

European Search Report; Dated Mar. 2, 2017, Eight (8) Pages.
Korean Office Action dated Mar. 2, 2017 and English Translation thereof.

*Primary Examiner* — Christopher Schwartz
(74) *Attorney, Agent, or Firm* — William H. Honaker; Dickinson Wright PLLC

(57) ABSTRACT

A hydraulic damper (3) includes a tube (4), a piston assembly (5) disposed slidably inside the tube (4), and an additional valve assembly (13). A compression chamber (9) is defined between the piston assembly (5) and the additional valve assembly (13). An additional compensation chamber (14) is defined between the additional valve assembly (13) and one side of a slideable partition (10). A gas chamber (11) is defined at the other side of the slidable partition (10). The damper includes an additional chamber assembly (15) to retain all the advantages of a twin-tube damper while providing the single construction offered by a mono-tube damper. One end of the additional chamber assembly (15) is attached to the slidable piston chamber (5) or to said piston rod (6) at the compression side thereof and the other end of said additional chamber assembly (15) is terminated with the additional valve assembly (13).

8 Claims, 2 Drawing Sheets

(52) U.S. Cl.
CPC ...... *B60G 2202/24* (2013.01); *B60G 2206/41* (2013.01); *F16F 9/067* (2013.01); *F16F 2230/32* (2013.01)

(58) Field of Classification Search
USPC .......... 188/313, 314, 322.13, 322.15, 322.22
See application file for complete search history.

(56) References Cited

U.S. PATENT DOCUMENTS

| | | | |
|---|---|---|---|
| 3,762,514 A | | 10/1973 | Freitag |
| 3,865,356 A | * | 2/1975 | Wossner ................. F16F 9/067 188/269 |
| 4,106,596 A | | 8/1978 | Hausmann |
| 4,132,395 A | | 1/1979 | Fox, Jr. |
| 4,381,857 A | * | 5/1983 | Cook ..................... F16F 9/063 188/317 |
| 4,445,671 A | | 5/1984 | Reuschenbach et al. |
| 6,152,432 A | * | 11/2000 | Perrin ....................... F16F 9/06 188/276 |
| 6,374,966 B1 | * | 4/2002 | Lillbacka ............... B60G 15/12 188/266 |
| 7,100,750 B2 | * | 9/2006 | Drees ................... F16F 9/5126 188/280 |
| 7,140,601 B2 | | 11/2006 | Nesbitt et al. |
| 7,513,490 B2 | * | 4/2009 | Robertson ............... F16F 9/063 188/315 |
| 8,590,677 B2 | * | 11/2013 | Kim ....................... F16F 9/5126 188/280 |
| 8,746,423 B2 | * | 6/2014 | Maeda ....................... F16F 9/19 188/313 |
| 2012/0018263 A1 | | 1/2012 | Marking |
| 2012/0160624 A1 | * | 6/2012 | Katayama ............ F16F 9/3484 188/314 |

FOREIGN PATENT DOCUMENTS

| | | |
|---|---|---|
| CN | 102889329 A | 1/2013 |
| DE | 1006672 B | 4/1957 |
| DE | 1150288 B | 6/1963 |
| DE | 1183384 B | 12/1964 |
| DE | 1228862 B | 11/1966 |
| DE | 1240340 B | 5/1967 |
| DE | 102006045236 A1 | 4/2008 |
| DE | 102008054006 A1 | 2/2010 |
| DE | 102011010070 A1 | 8/2012 |
| EP | 03262716 A2 | 4/1990 |
| EP | 03262716 B1 | 4/1990 |
| EP | 0884499 A1 | 12/1998 |
| EP | 2019228 A2 | 1/2009 |
| FR | 1069128 A | 7/1954 |
| GB | 740112 | 11/1955 |

* cited by examiner

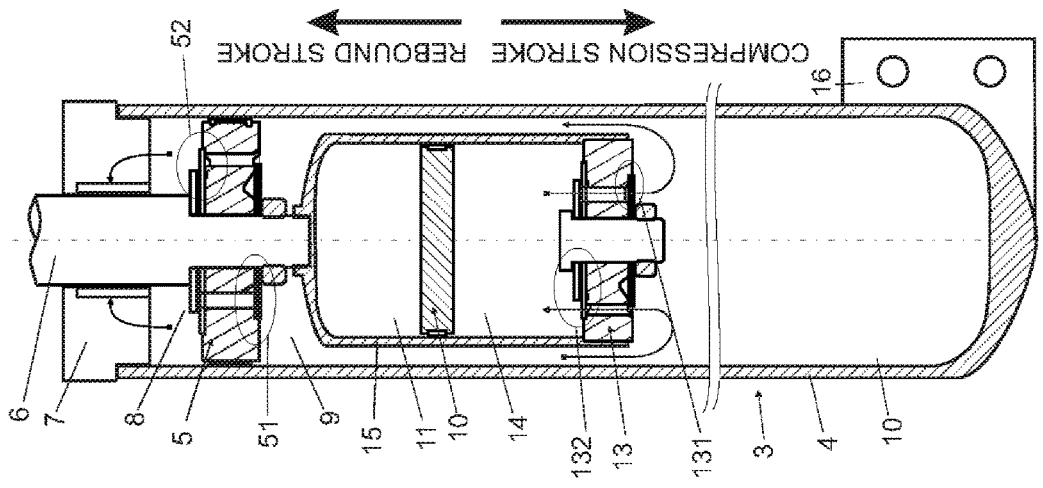
Fig. 1 (state of art)
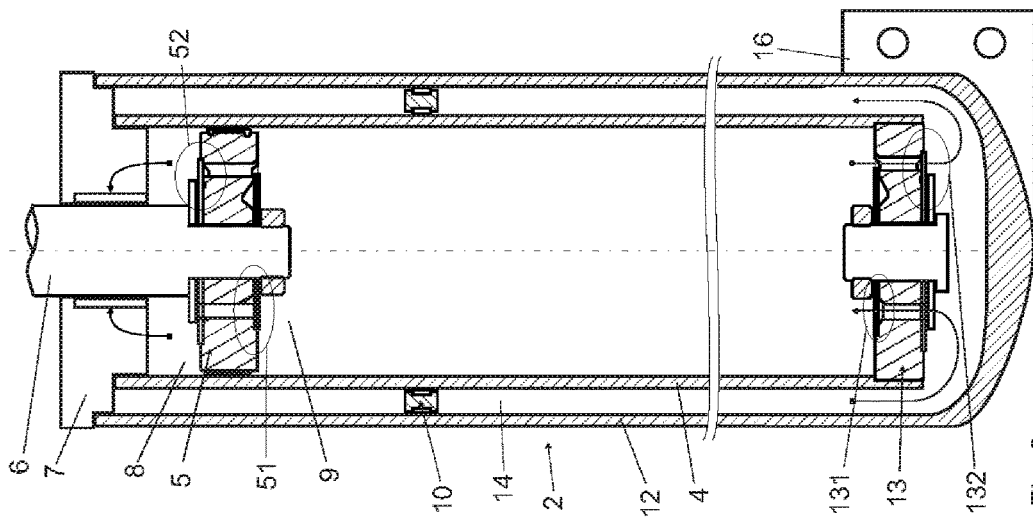
Fig. 2 (state of art)
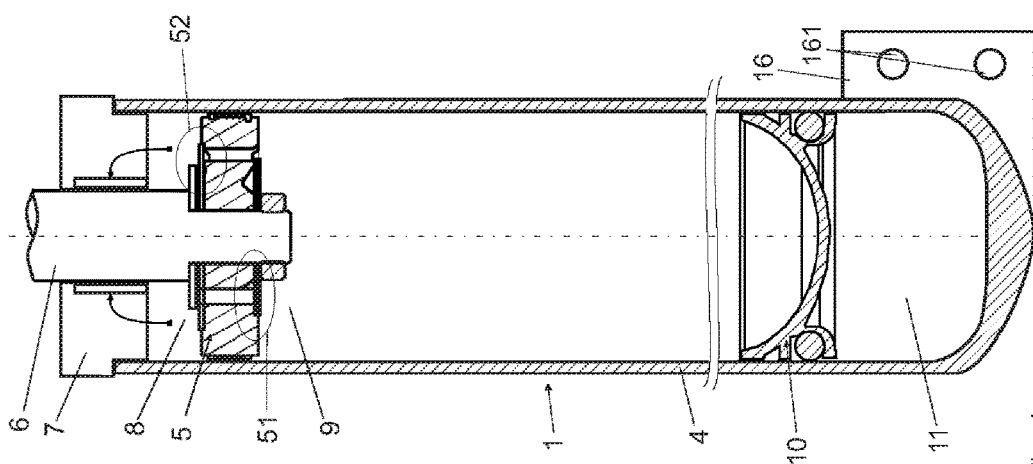
Fig. 3

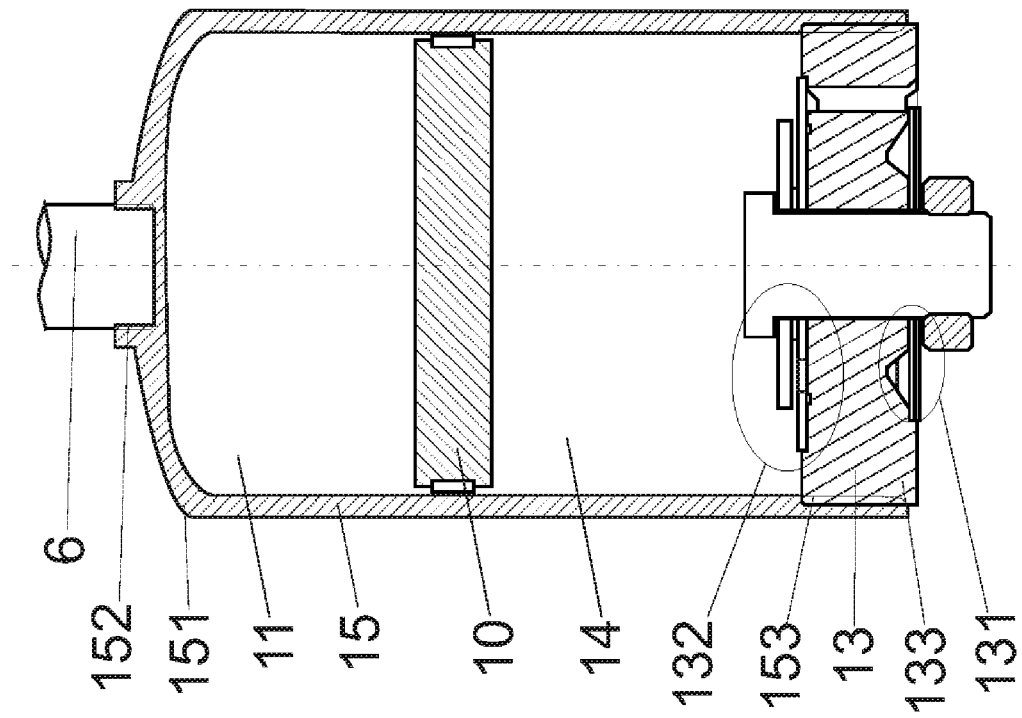
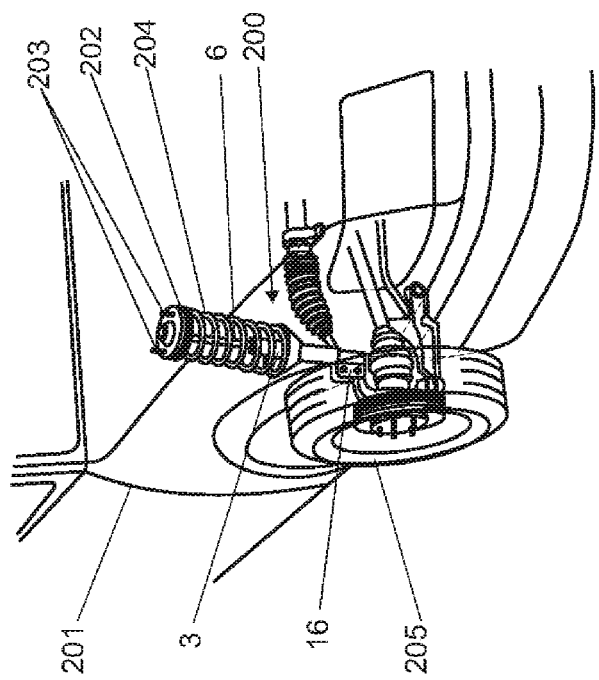
Fig. 4
Fig. 5

HYDRAULIC SUSPENSION DAMPER

CROSS REFERENCE TO RELATED APPLICATION

This application claims the benefit of PCT International Application Serial No. PCT/CN2013/080518 filed on Jul. 31, 2013, the entire disclosures of which is incorporated herein by reference.

FIELD OF THE INVENTION

The invention relates to a hydraulic damper, in particular a motor vehicle suspension damper, comprising: a tube; a piston assembly disposed slidably inside the tube and attached to a piston rod led outside the tube through a sealed piston rod guide located at the end of the tube, wherein a rebound chamber filled with working liquid is defined between said piston rod guide and said piston assembly; an additional valve assembly, wherein a compression chamber filled with working liquid is defined between said piston assembly and said additional valve assembly; a slidable partition, wherein an additional compensation chamber filled with working liquid is defined between said additional valve assembly and one side of said slidable partition; a gas chamber filled with pressurised gas and defined at the other side of said slidable partition; wherein said piston assembly is provided with rebound valve and compression valve to control the flow of working liquid passing between said compression chamber and said rebound chamber, respectively, during rebound and compression stroke of the damper, and said additional valve assembly is provided with rebound valve and compression valve to control the flow of working liquid passing between said additional compensation chamber and said compression chamber, respectively, during rebound and compression stroke of the damper.

BACKGROUND OF THE INVENTION

Dampers of the features as above are known from the state of art as twin-tube dampers. They provide excellent tuning capabilities enabling for independent tuning both the valves of a slidable piston assembly and the valves of an additional base valve assembly that in a case of twin-tube dampers is located at the bottom end of the main tube. Twin-tube dampers also require relatively low pressure of the pressurised gas what results in relatively low internal pressure of the working liquid filling the damper, inducing relatively low friction force between a piston rod and a rod guide seal. Furthermore, the external tube is not used to guide the slidable piston assembly. Therefore possible deformations of the external tube, in particular in the bottom zone of the damper, where it is usually fixed to the steering knuckle of a vehicle suspension have no influence on the operation of the damper. Also the piston assembly is designed not to reach this bottom zone of the external tube in its sliding movement.

Nonetheless, twin-tube dampers also have some disadvantages due to their complex structure, such as inter alia the necessity to provide a base valve assembly and a rod guide of a construction enabling for support of the external tube.

These disadvantages of the twin tube dampers have been substantially eliminated in mono-tube dampers in which all three chambers, i.e. a rebound chamber, a compression chamber and a gas chamber, are arranged serially in a single tube. Mono-tube dampers are devoid of an additional valve assembly and an additional compensation chamber. A slidable partition is provided between the compression chamber and the gas chamber.

However, other problems arise. Higher pressure is required in the chambers of the damper to eliminate free displacement of a slidable partition with no damping force generated by the valves of the piston assembly (a so called "no damping stroke effect"). This increased pressure in turn requires an improved sealing of the piston rod guide which in turn generates higher friction forces between the piston rod and the rod guide seal. Furthermore, the damper's length is increased since the gas chamber is positioned in series with the compression chamber along the longitudinal axis of the damper. Moreover, a certain dead zone exists at the end of the gas chamber where possible deformations of the main tube (which in this case is also an external tube) might lead to jamming of the slidable partition or otherwise limiting its sliding movement. Finally mono-tube dampers often provide significantly limited tuning capabilities as compared to twin-tube dampers.

Yet another common disadvantage of both the above-mentioned damper types is a necessity to fill the gas chamber with a pressurised gas which process depends on the process of filing the damper with a working liquid.

It has been the object of the present invention to provide a hydraulic damper that would retain all the aforementioned advantages of a twin-tube damper along with simplicity of construction as provided by a mono-tube damper.

The inventors discovered that achieving these objects is possible by diverting the flow of working liquid radially inside the compression chamber (instead as radially outside as in twin-tube dampers).

SUMMARY OF THE INVENTION

Therefore, a damper of the kind mentioned in the outset, according to the present invention is characterised in that it is provided with an additional chamber assembly, wherein one end of said additional chamber assembly is attached to said slidable piston assembly or to said piston rod at the compression side thereof and the other end of said additional chamber assembly is terminated with said additional valve assembly, wherein said pressurised gas chamber and said additional compensation chamber are located inside said additional chamber assembly and are separated by said slidable partition.

Preferably the damper of the present invention is a mono-tube damper. This enables for achieving simplicity of damper construction, although the additional chamber assembly may obviously also be used as an additional tuning add-on in a twin-tube damper, for example to provide additional tuning options.

Preferably said additional chamber assembly comprises a uniform body, preferably screwed to the end of the piston rod. This provides a cost efficient method of manufacturing the chamber assembly in a simple stamping process.

Preferably said additional chamber assembly is a separate subassembly of the damper independently assembled and filled with a pressurized gas. This further improves damper assembly process.

BRIEF DESCRIPTION OF DRAWINGS

The invention shall be described and explained below in connection with the attached drawings on which:

FIG. 1 is a schematic cross-sectional view of a typical mono-tube damper known from the state of art;

FIG. 2 is a schematic cross-sectional view of a typical twin-tube damper known from the state of art;

FIG. 3 is a schematic cross-sectional view of an embodiment of a damper according to the present invention;

FIG. 4 a detailed cross-sectional view of the embodiment of an additional chamber assembly according to the present invention, and FIG. 5 is a schematic perspective view of a fragment of a typical vehicle suspension.

DETAILED DESCRIPTION OF PREFERRED EMBODIMENTS

A hydraulic damper 1 shown in part in FIG. 1 is an example of a mono-tube hydraulic damper that may be employed in a vehicle suspension 200 presented in FIG. 5. It is shown almost fully extended in its position close to the end of the rebound stroke and comprises main cylinder tube 4 inside of which a piston assembly 5 is slidably disposed. The piston assembly 5 is attached to a piston rod 6 led outside the main tube 4 through a sealed piston rod guide 7 located at the end of the tube. The other end (not shown) of the piston rod 6 may be connected to the top mount 202 of the vehicle suspension 200. The opposite end of the tube 4 is provided with an attachment means 16, in a form of a bracket with two mounting holes 161, apt to fix the damper 1 to the steering knuckle or a swing arm supporting the vehicle wheel 205.

Arched arrow lines running from the rebound chamber 8 to the sealing of the piston rod guide 7 schematically symbolize a friction force between the rod guide 6 and the sealing resulting from a reaction of the internal damper pressure to the guide sealing.

A rebound chamber 8 filled with working liquid is defined between the piston rod guide 7 and the piston assembly 5. A slidable partition 10 is disposed at the other end of the damper 1. A compression chamber 9 filled with working liquid is defined between the piston assembly 5 and the slidable partition 10. Pressurised gas fills the space at the other side of the slidable partition 10 defining a gas chamber 11.

The term "rebound", as used in this specification with reference to particular elements of the damper, denotes these elements or these parts of particular elements which point toward the piston rod or—in a case of a flow direction of the working liquid—it refers to this flow direction that takes place during the rebound stroke of a damper. Similarly, the term "compression", as used herein with reference to particular elements of the damper, denotes these elements or parts of elements which point in a direction opposite to the piston rod or—in a case of a flow direction of the working liquid—it refers to this flow direction that takes place during the compression stroke of a damper.

The piston assembly 5 is provided with rebound 51 and compression 52 valves to control the flow of working liquid passing between the compression chamber 9 and the rebound chamber 8, respectively, during rebound and compression stroke of the damper. Each valve 51 and 52 comprises a number of flow channels disposed equiangularly over the perimeter of the piston assembly 5 and a number of resilient deflectable discs covering that channels and deflecting under the pressure of working liquid. Number, shape, diameter and thickness of discs, as well as number and cross-sectional area of the channels constitute, among others, the parameters that may be utilized to influence damper characteristics.

As shown, the forces or vibrations transformed to the bracket 16 may lead to deformations of the damper tube in the zone of the bracket 16. These deformations, in turn, might lead to jamming of the slidable partition 10 or otherwise limiting its sliding movement, which must be considered while designing the damper.

Above and below reference numerals of elements performing the same or similar functions remain the same, as in FIG. 1.

FIG. 2 illustrates an exemplary twin-tube hydraulic damper 2 comprising main tube 4 and an external tube 12. As shown the damper 2 is provided with an additional valve assembly 13, commonly referred to as a base valve assembly and fixed at the end of the main tube 4. A compression chamber 9 filled with working liquid is defined between the piston assembly 5 and the base valve assembly 13, wherein an additional compensation chamber 14 filled with working liquid is defined between the base valve assembly 13 and a slidable partition 10 in a form of a ring disposed between the main tube 4 and the external tube 12.

The additional valve assembly 13 is provided with rebound 131 and compression 132 valves to control the flow of working liquid passing between the additional compensation chamber 14 and the compression chamber 9, respectively, during rebound and compression stroke of the damper. Similarly, as in the case of the piston assembly 5, the valves 131 and 132 comprise a number of flow channels disposed equiangularly over the perimeter of the body of the additional valve assembly 13 and a number of resilient deflectable discs covering that channels and deflecting under the pressure of working liquid. Similarly, as in the case of valves 51 and 52 of the piston assembly 5, the valves 131 and 132 of the additional valve 13 assembly provide additional parameters that may be used to influence damper characteristic.

In a damper of this kind, a gas chamber 11 filled with pressurised gas is defined at the other side of the slidable partition 10 and is further delimited by the radially outer surface of the main tube 4, radially inner surface of the external tube 12 and axially inner surface of the piston rod guide 7.

Arrow lines between the compression chamber 9 and the additional compensation chamber 14 schematically represent radially inward and radially outward flow of working liquid through the additional valve assembly 13 between chambers 9 and 14, respectively, during rebound and compression stroke of the damper. In other words, in a twin-tube damper, a path of working liquid flow through the additional valve assembly 13 runs outwardly relative to the main tube 4 axis.

An embodiment of a damper 3 according to the present invention is illustrated on FIG. 3. As shown the damper 3 comprises only a main tube 2 so in this context it is a damper of a mono-tube type. Nonetheless, the damper 3 is additionally provided with an additional chamber assembly 15 attached on one end to the end of a piston rod 6 below a slidable piston assembly 5. The chamber assembly 15 is terminated at the other end with an additional valve assembly 13 and comprises a slidable partition 10 making a sliding fit on the radially inner surface of the assembly 15. The partition 10 divides the interior of the chamber assembly 15 into a pressurised gas chamber 11, at the top section of the chamber assembly 15, and an additional compensation chamber 14 at the bottom section of the assembly 15. The additional valve assembly 13 is provided with rebound 131 and compression 132 valves to control the flow of working liquid passing between the additional compensation chamber 14 and the compression chamber 9, respectively, during rebound and compression stroking cycle of the damper.

In comparison with the twin-tube damper 2 of FIG. 2, in the damper 3 the working liquid flows through the additional valve assembly 13 during compression and rebound chamber radially inward relative to the main tube 4.

FIG. 4 presents an enlarged view of the additional chamber assembly 15 of the damper 3 shown in FIG. 3. The body 151 of the assembly has a form of a simple, uniform cup-shaped element provided at the top with an inner, cylindrical, and threaded recess 152 to receive and be fixedly attached to a threaded end of the piston rod 6. The body 151 is opened at the bottom and provided with an internal thread 153 on its internal surface.

The body 133 of the additional valve assembly 13 is screwed into an internal thread 153. Both the compression valve 132 and the rebound valve 131 comprise a number of through channels disposed equiangularly over the perimeter of the body 133 and a number of resilient deflectable discs covering that channels and deflecting under the pressure of working liquid.

The partition 10 makes a sliding fit with the inner surface of the body 151 of the additional chamber assembly 15. Since no external forces act on the additional chamber assembly 15 while the damper is working, no deformations will occur and the sliding movement of the partition 10 is by no means limited.

In the context of the damper assembly process, the additional chamber assembly 15 according to the present invention constitutes a separate subassembly that may be preliminarily and independently assembled and filled with a pressurized gas and thereafter screwed on the threaded end of the piston rod 6.

FIG. 5 schematically illustrates a fragment of a vehicle suspension 200 attached to a vehicle chassis 201 by means of a top mount 202 and a number of screws 203 disposed on the periphery of the upper surface of the top mount 202. The top mount 202 is connected to a coil spring 204 and a rod 6 of a damper, such as the one made according to the principles of the present invention. At the other end the attachment means 16 fixed to the damper 3 tube connects the damper 3 to the steering knuckle or a swing arm supporting the vehicle wheel 205.

In order to measure the influence of the chamber assembly of the present invention on the damper performance the inventors compared the typical mono-tube damper known from the prior art, corresponding to the one shown in FIG. 1, with the damper made according to the present invention, corresponding to the one shown in FIG. 3.

Testing procedure involved measuring friction at the piston rod guide during the damper operation. Characteristic dimensions of the dampers being tested, as well as the results of the testing procedure are listed in Table 1.

TABLE 1

Comparison of a mono-tube damper with damper according to the invention

| | Mono-tube damper | |
| --- | --- | --- |
| | typical | with an additional chamber assembly |
| Diameter of the piston rod (6) | 14 mm | 14 mm |
| Internal diameter of the main tube (4) | 46 mm | 46 mm |
| Diameter of the slidable partition (10) | 46 mm | 36 mm[(1)] |
| Gas pressure | 25 bar | 5 bar |

TABLE 1-continued

Comparison of a mono-tube damper with damper according to the invention

| | Mono-tube damper | |
| --- | --- | --- |
| | typical | with an additional chamber assembly |
| Gas force | 400N | 100N |
| Friction* | ~110N | ~60N |

[(1)]partition 10 is disposed within the chamber assembly 15.

As shown, the damper according to the present invention enables for a 5-fold (25 bar vs. 5 bar) decrease of pressure in the gas chamber 11 in comparison with a mono-tube damper, which yields almost 2-fold decrease in the friction force (110 N vs. 60 N) at the piston rod guide 7, which substantially improves a vehicle ride comfort.

The above embodiments of the present invention are merely exemplary. The figures are not necessarily to scale, and some features may be exaggerated or minimized. These and other factors, however, should not be considered as limiting the spirit of the invention, the intended scope of protection of which is indicated in appended claims.

The invention claimed is:

1. A hydraulic damper (3), in particular a motor vehicle suspension damper, comprising:
   a tube (4);
   a piston assembly (5) disposed slidably inside the tube (4) and attached to a piston rod (6) led outside the tube through a sealed piston rod guide (7) located at the end of the tube (4), wherein a rebound chamber (8) filled with working liquid is defined between said piston rod guide (7) and said piston assembly (5);
   a valve assembly (13), wherein a compression chamber (9) filled with working liquid is defined between said piston assembly (5) and said valve assembly (13);
   a slidable partition (10), wherein a compensation chamber (14) filled with working liquid is defined between said valve assembly (13) and one side of said slidable partition (10);
   a gas chamber (11) filled with pressurised gas and defined at the other side of said slidable partition (10);
   said piston assembly (5) provided with rebound valves (51) and compression valves (52) to control the flow of working liquid passing between said rebound chamber (8) and said compression chamber (9), respectively, during rebound and compression stroke of the damper,
   said valve assembly (13) provided with rebound valve (131) and compression valve (132) to control the flow of working liquid passing between said compensation chamber (14) and said compression chamber (9), respectively, during rebound and compression portions of the stroking cycle of the damper; and
   a chamber assembly (15), wherein one end of said chamber assembly (15) is attached to said slidable piston assembly (5) or to said piston rod (6) at the compression side thereof and the other end of said chamber assembly (15) is terminated with said valve assembly (13), wherein said slidable partition (10) is disposed in said chamber assembly (15) and in sealing engagement with said chamber assembly (15) defining said pressurised gas chamber (11) and said compensation chamber (14) located inside said chamber assembly (15).

2. The hydraulic damper according to claim 1, wherein the hydraulic chamber is a mono-tube damper.

3. The hydraulic damper according to claim 2, wherein said chamber assembly (15) comprises a uniform body (151), preferably screwed to the end of the piston rod (6).

4. The hydraulic damper according to claim 3, wherein said chamber assembly (15) is a separate subassembly of the damper (3) independently assembled and filled with a pressurized gas.

5. The hydraulic damper according to claim 2, wherein said chamber assembly (15) is a separate subassembly of the damper (3) independently assembled and filled with a pressurized gas.

6. The hydraulic damper according to claim 1, wherein said chamber assembly (15) comprises a uniform body (151), preferably screwed to the end of the piston rod (6).

7. The hydraulic damper according to claim 6, wherein said chamber assembly (15) is a separate subassembly of the damper (3) independently assembled and filled with a pressurized gas.

8. The hydraulic damper according to claim 1, wherein said chamber assembly (15) is a separate subassembly of the damper (3) independently assembled and filled with a pressurized gas.

* * * * *